Figure 1:
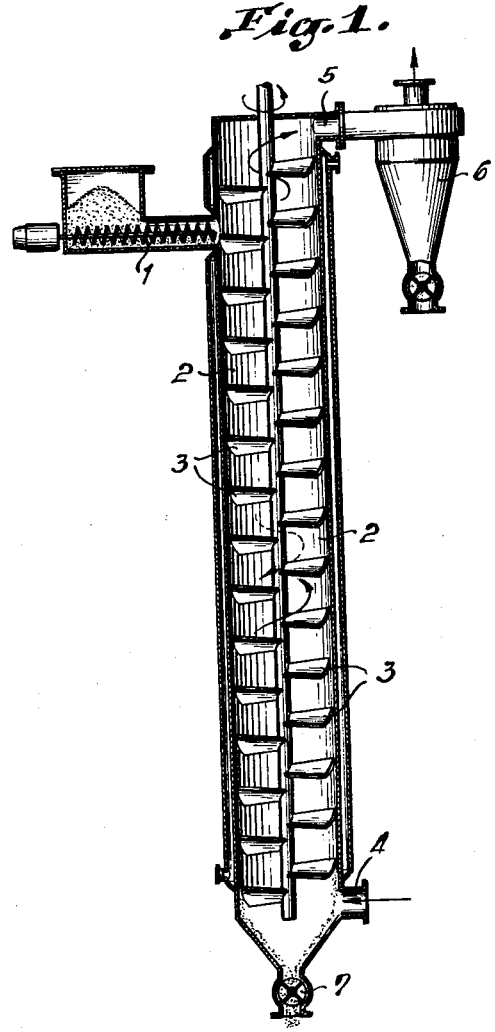

Jan. 29, 1963 F. SCHAUB 3,075,298
APPARATUS FOR TREATING SOLIDS IN A GAS STREAM
Filed Feb. 17, 1959 2 Sheets-Sheet 1

INVENTOR:
FRANZ SCHAUB
By Burgess, Dinklage & Sprung
ATTORNEYS

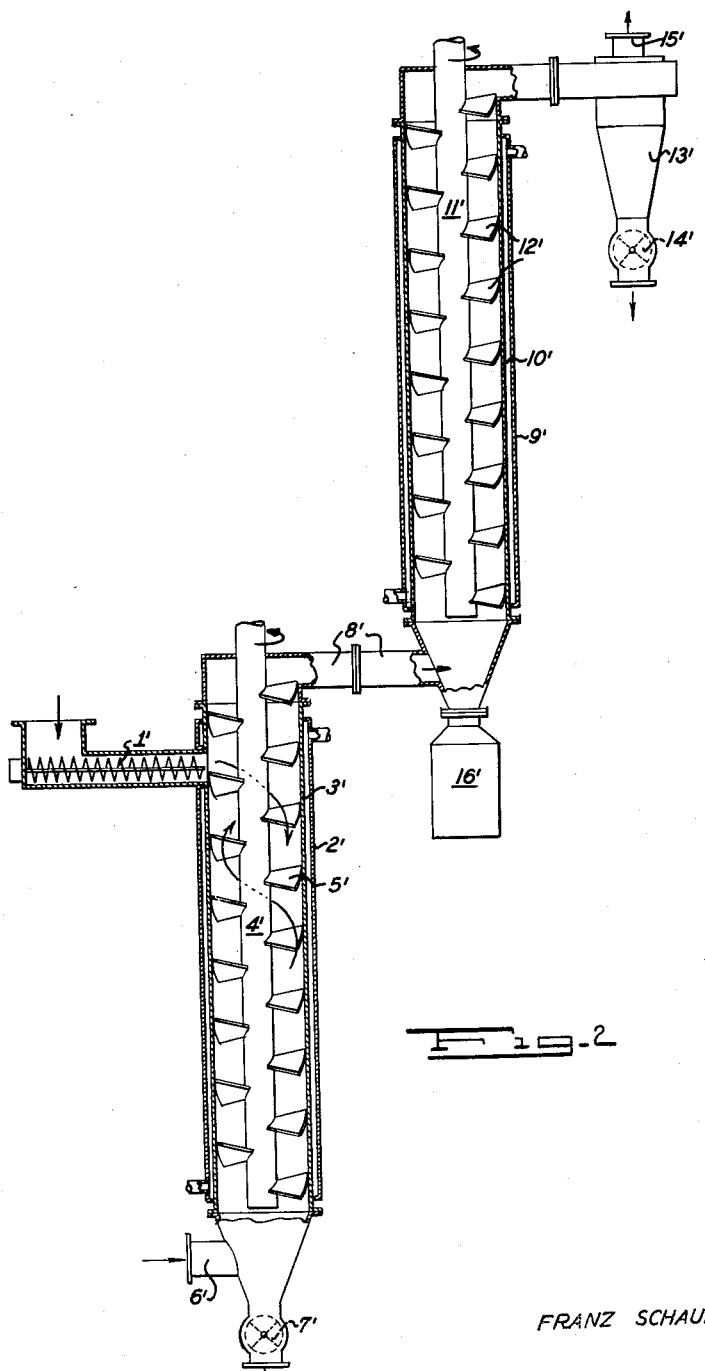

_United States Patent Office_

3,075,298
Patented Jan. 29, 1963

3,075,298
APPARATUS FOR TREATING SOLIDS IN A GAS STREAM
Franz Schaub, Oberhausen-Holten, Germany, assignor to Ruhrchemie Aktiengesellschaft, Oberhausen-Holten, Germany, a corporation of Germany
Filed Feb. 17, 1959, Ser. No. 793,759
Claims priority, application Germany Feb. 22, 1958
3 Claims. (Cl. 34—166)

The present invention relates to the treatment of solids in a gas stream and more particularly to a process for treating solid particles by passage through a helical path in countercurrent direction to the gas stream.

Heretofore, divided solids of small particle size have been treated by various processes wherein the solids are contained in a stream of gas and thereby conducted along a heated tube in a helical flow path. This type of pneumatic conveying is made possible by the co-current flow of the solids and the treating gas in the same direction.

It is an object of the invention to provide a more effective treatment of divided solids in a gas stream.

It is a further object of the invention to provide an improved process for treating, and particularly drying, small particle size solids by means of a gas stream flowing in counter current direction, and to provide an apparatus for such treatment.

Other and further objects will become apparent from the within specification and accompanying drawing in which, FIG. 1 is a side elevation view partially in section of an embodiment of an apparatus for carrying out the process of the invention.

FIG. 2 is a side elevation view partially in section of an embodiment of a modified apparatus for carrying out the process of the invention.

It has been found in accordance with the invention that divided solids such as small particle size solids may be effectively treated, and particularly oven dried, by passage through a conduit zone, which may be externally heated or cooled, in a helical path in countercurrent direction to a gas stream. The gas is preferably conducted at a relatively high velocity into the bottom of a vertical conduit zone in substantially tangential direction to the confining circular inner surface thereof. As a result, the gas flows along said inner surface in a gradually ascending helical path, the upward linear flow velocity of said gas in axial direction being relatively low. Rotational movement of the gas is brought about by directing the gas stream into the bottom of the conduit zone along the continuous inner surface thereof and by positioning in said tube a plurality of axially ascending vane guide members in helical manner as well.

Into the top of the conduit zone, the solids to be treated are fed, which, in turn, travel downwardly through the conduit zone in a helical direction by gravity. The solids, therefore, pass through the treating zone in counter current direction to the upwardly ascending gas and at a rate of fall which is reduced by reason of the gas flow.

In accordance with the process of the invention, an improved efficiency and economy is obtained due to the counter current flow relation between the gas and the solids as well as the enhanced exchange of heat which preferably takes place between the conduit zone confining surface and the solids.

The velocity of the ascending gas stream is preferably maintained slightly below that which would keep the solids in suspension or entrain the solids in upward direction and in turn carry them out of the top of the conduit zone. Accordingly, the solids travel downwardly through the conduit zone in a helical path at a relatively low linear velocity of fall and with a simultaneous vigorous turbulent motion in counter current direction to the gas and are finally withdrawn at the bottom of the zone. Despite a high gas flow velocity, it will be seen that relatively long periods of treatment can be maintained which are often desirable. Such extended treatment periods, of course, cannot be achieved with conventional pneumatic conveying of solids in a treating gas by co-current flow in the same direction. These extended periods are especially important where drying treatment is intended, and in this respect in accordance with the invention a particularly favorable ratio of solids throughput to gas flow rate and consequently a correspondingly optimum utilization of treating gas is made possible.

When applying the process to drying, cooling or heating, an inert gas such as air, nitrogen, carbon dioxide, etc. may be used as the carrier gas. In these cases, there occurs only a certain heat and mass exchange. The process is, however, also applicable for effecting adsorption and absorption processes (also for dusting) as well as for surface reactions between solids and gases. An example of the latter reaction is the superficial treatment of fertilizers with ammonia.

Referring to the drawing, FIG. 1 shows a cylindrical tower 2 in upright position having a screw feeder 1 at the top portion by which the solid materials to be treated are introduced. Disposed within tower 2 are radially arranged suitably pitched guide members 3 on an axially positioned shaft. The shaft may be rotated together with the guide members 3 during operation. The solids pass downwardly traveling over guide members 3 in a substantially helical flow pattern. The treating gas enters at 4, and under the action of guide members 3 moves along similar helical paths in upwardly directions through tower 2, in counter current direction to the solids being treated. The gas leaves the tower 2 through exit 5, and preferably is freed from any entrained solid particles in separator 6. The treated solids are withdrawn at the conically-shaped tower bottom by means of rotary valve 7.

The diameter of the tower may be varied within wide limits, for example, between 50 mm. and 1000 mm., the latter figure not being regarded as the upper limit. The pitch of the guide members and consequently of the direction of flow of the gas stream ascending on a helical path should be reduced as the diameter of the tower increases in order to obtain in each case a sufficient centrifugal force. For example, suitable degrees of pitch have been found to be from 20 to 40 degrees for tubes of 150 mm. diameter and from 10 to 20 degrees for tubes of 150 mm. diameter and from 10 to 20 degrees for tubes of 400 mm. diameter. For towers of larger diameters, still smaller angles of pitch may be used, the most preferable values depending upon the type of solids, the particle size and the particular process to be carried out.

It is of particular importance that the flow velocity of the treating gas, depending on the size, the specific gravity and the specific resistance of the solid particles, be adjusted to a suitable value such that the solids being treated will travel downwardly in opposite direction to that of the gas. For example, the linear velocity of the gas in upward direction or stated otherwise, the vertical component of the gas velocity, should be about 20% below the suspension velocity of the solid particles. The axial component of the gas velocity is so adjusted that it is lower than the velocity of fall of the solid particles being treated, i.e. it depends upon the size of particles and the difference between the specific gravity of the solid and that of the gas. For example, it may be adjusted to about 80% of this velocity of fall.

The particle sizes of the materials being treated are preferably in the range of between 0.1 and 5 mm., which is not the absolute upper limit. Examples of materials which may be treated include plastic materials in granular or pulverulent form, fertilizers in granular form, seeds including oil seeds and cereals.

It will be realized that various solid particles have different suspension velocities in a gas stream. The suspension velocity of a solid particle may be defined as the gas stream velocity necessary to suspend the same therein. For some solid particles a lower gas suspension velocity is needed while in the case of other solid particles a higher gas suspension velocity is required.

Since granular mixtures consisting of particles having different suspension velocities are frequently encountered in industrial practice, it is necessary to provide longer treatment periods for those particles having higher suspension velocities than for those having lower suspension velocities. This is true because the former will fall faster through a given counter current gas stream than the latter where the vertical component of the helically ascending gas stream is less than that required to keep any of the particles in suspension.

In such cases, in accordance with a further feature of the invention, a combination of two treatment steps may be used. The granular mixture is fed to a first conduit zone as above described for counter current treatment with the treating gas stream, but in this case, the vertical component of the velocity of the gas stream ascending in helical manner is of a magnitude that the particles having higher suspension velocities have a longer treating period in the conduit zone before reaching the bottom. This is achieved by employing a gas velocity having a vertical component approaching the suspension velocity of said particles.

As a result of this magnitude of gas velocity, the particles having lower suspension velocities do not descend in the conduit zone, but instead are entrained in the gas stream and pass out of the conduit zone therewith. This portion of the granular mixture is passed to a second conduit zone wherein co-current treatment with entraining gas takes place. Although the period of treatment of these particles having lower suspension velocities is less in the second zone than the period of treatment of the particles having higher suspension velocities in the first zone, the length of treatment in each case is sufficient for the particular particles encountered.

Specifically, this second zone treatment of the mixture of solids having lower suspension velocities and gas may be carried out by means of a gas stream conducted along a helical path in an externally heated or cooled flow tube, in the interior of which helical guide members may be provided causing the treating agent and the material being treated to follow a common helical path in the same direction. These guide members may be formed by vane-shaped helically curved or flat plates attached to a rotatable rod or pipe extending axially through the center portion of the flow tube. The guide members, therefore, should not be in contact with the inner wall of the flow tube. Moreover, for this second zone treatment, the flow rate and the pitch of the plates should be adapted to each other such that a curtain of material conducted in a helical path along the inner tube wall is maintained. At the same time, the guide members should be disposed in such a manner that the gas stream is repeatedly divided thereby.

Referring to FIG. 2, a combination of two treatment steps may be carried out wherein the material to be dried, for example, passes via the screw feeder 1' to the cylindrical drying tower 2' which is provided with a heating mantle 3' along its exterior surface. Radially arranged, suitably pitched guide members 5' are provided along the extent of a rotatably arranged shaft 4' axially disposed within tower 2'. As the shaft 4' and the guide members 5' rotate, the solids entering via screw feeder 1' pass downwardly through tower 2', travelling over guide members 5' in a substantially helical flow pattern. The treating gas, such as a drying gas, enters the bottom of tower 2' through gas inlet 6' and travels upwardly, in countercurrent direction to the solids being treated, through tower 2' in a similar helical path due to the presence of guide members 5'.

As a result of the gas velocity passing upwardly through tower 2', the solid particles having higher suspension velocities pass downwardly through tower 2' and are collected at the conically shaped lower portion of tower 2' and withdrawn therefrom by means of rotary valve 7'. Since a vertical component of the velocity of the gas stream ascending in a helical manner through tower 2', is of such a magnitude that it exceeds the vertical suspension velocity of a portion of the particles having lower suspension velocities, these lower suspension velocity particles do not descend in tower 2' but instead are entrained in the upwardly passing gas stream. These particles pass with the entrained gas from the top of tower 2' by means of connecting pipe 8' and enter the lower end of a similarly arranged tower 9' vertically extending above the top end of tower 2'. The fine constituents of dry material to be further treated pass upwardly through tower 9' in the same manner in a helical path due to the presence of axially positioned rotatable shaft 11' having guide members 12' disposed therealong in the same manner as guide members 5' of tower 2'. Tower 9' is provided along its exterior with a similar heating mantle 10'.

In tower 9', the heavier particles eventually fall to the conically shaped lower end of tower 9' and are collected in a collecting vessel 16'. The lighter particles, however, pass upwardly through tower 9' and leave the top end thereof together with the gas, whereby the same are separated from one another in the cyclone separator 13'. The gas leaves by means of outlet 15' at the top of separator 13' while the light solid particles are collected in the lower end of the separator 13' and withdrawn by means of rotary discharge device 14'.

It will be appreciated that by adjusting the gas velocity, the heavier solid particles may receive a longer period of countercurrent treatment in tower 2', while the lighter particles having lower suspension velocities will be passed to tower 9' where the heavier portion of the entrained particles will receive a countercurrent treatment and be passed downwardly to vessel 16' while the lighter portion of these particles will receive a co-current treatment with the gas and be separated therefrom in the separator 13' at the upper end of tower 9'.

*Example*

In a jacket-heated tube of 150 mm. in diameter and 6 m. in length equipped with guide members having a pitch of 60 degrees with respect to the tube axis, air was drawn in at the bottom at an axial velocity of 3 m./second and withdrawn at the top. At the same time, moist plastic granules were fed at the top of the tube by means of a rotary valve. The granules had an average diameter of 3 mm. and a moisture content of 10 to 15%. The throughput of granules was 600 kg./hr. At the bottom of the tube, dry granules having a moisture content of less than 0.1% were withdrawn.

What is claimed is:
1. An apparatus for treatment of divided solid materials by means of a gas stream which comprises means defining an elongated conduit having a continuous inner surface, a plurality of radially outwardly extending guide vane means disposed in helical configuration along the axis of said conduit means and pitched with respect to said axis an angle between about 10 and 60 degrees, means for introducing solid materials into the top portion of said conduit means and for introducing a treating gas into the bottom portion of said conduit means, means for removing said solid materials from the bottom portion of said conduit means, means for rotating said guide vane means about the axis of said conduit means, and means for removing said treating gas from the top portion of said conduit means.

2. An apparatus according to claim 1 wherein external means are provided for heat exchange through said conduit means inner surface.

3. An apparatus according to claim 1 wherein said conduit means is cylindrical, and said guide vane means are positioned on a rotatable concentric shaft.

References Cited in the file of this patent

UNITED STATES PATENTS

| | | |
|---|---|---|
| 748,894 | Trump | Jan. 5, 1904 |
| 1,322,428 | Gloess | Nov. 18, 1919 |
| 2,069,192 | Behr | Jan. 26, 1937 |
| 2,180,968 | Schorn et al. | Nov. 21, 1939 |
| 2,274,948 | Ahlmann | Mar. 3, 1942 |
| 2,309,036 | Beardsley | Jan. 19, 1943 |
| 2,777,760 | Dineen et al. | Jan. 15, 1957 |
| 2,847,766 | Silver | Aug. 19, 1958 |
| 2,983,051 | Zimmerman | May 9, 1961 |

FOREIGN PATENTS

| | | |
|---|---|---|
| 1,146,233 | France | Nov. 7, 1957 |

UNITED STATES PATENT OFFICE
CERTIFICATE OF CORRECTION

Patent No. 3,075,298                                                     January 29, 1963

Franz Schaub

It is hereby certified that error appears in the above numbered patent requiring correction and that the said Letters Patent should read as corrected below.

Column 1, line 39, for "oven" read -- even --; column 2, line 33, for "upwardly" read -- upward --; lines 49 and 50, strike out "and from 10 to 20 degrees for tubes of 150 mm. diameter".

Signed and sealed this 3rd day of September 1963.

(SEAL)
Attest:

ERNEST W. SWIDER                                              DAVID L. LADD
Attesting Officer                                                     Commissioner of Patents